United States Patent [19]

Doyle

[11] Patent Number: 4,787,838
[45] Date of Patent: Nov. 29, 1988

[54] TUBING EXPANDER

[75] Inventor: Mark C. Doyle, San Diego, Calif.

[73] Assignee: Pacific Device, Inc., San Diego, Calif.

[21] Appl. No.: 2,005

[22] Filed: Jan. 12, 1987

[51] Int. Cl.⁴ ............................................. B29C 57/04
[52] U.S. Cl. .................... 425/393; 425/392; 425/394; 425/403; 425/515
[58] Field of Search ............... 425/214, 318, 338, 392, 425/393, 403, 394, 515, 518–521, DIG. 53, DIG. 218; 72/367, 369, 370, 392, 393, 453.01, 453.18, 453.16; 254/104, 124

[56] References Cited

U.S. PATENT DOCUMENTS

| | | | |
|---|---|---|---|
| 1,067,115 | 7/1913 | Hufford | 72/393 |
| 3,553,780 | 1/1971 | Kuhlemann | 425/393 X |
| 3,749,365 | 7/1973 | Van Gompel | 254/104 |
| 3,841,133 | 10/1974 | Rice, Jr. | 72/393 X |
| 4,080,140 | 3/1978 | Wilson et al. | 425/DIG. 218 |
| 4,155,242 | 5/1979 | Peterson | 254/124 X |
| 4,403,938 | 9/1983 | Seach et al. | 425/393 |
| 4,475,373 | 10/1984 | Ikenberry | 254/124 X |
| 4,494,398 | 1/1985 | Svoboda | 72/393 |

Primary Examiner—Richard L. Chiesa
Attorney, Agent, or Firm—Fulwider, Patton, Rieber, Lee & Utecht

[57] ABSTRACT

Apparatus for expanding resilient tubing includes first and second pins, sized to be received into the tubing to be expanded. The second pin, extending from a carriage, is separated from the first pin by the movement of the carriage from a first position adjacent the first pin to a second position spaced apart from the first pin. The carriage is impelled by a foot-switch actuated air cylinder.

11 Claims, 3 Drawing Sheets

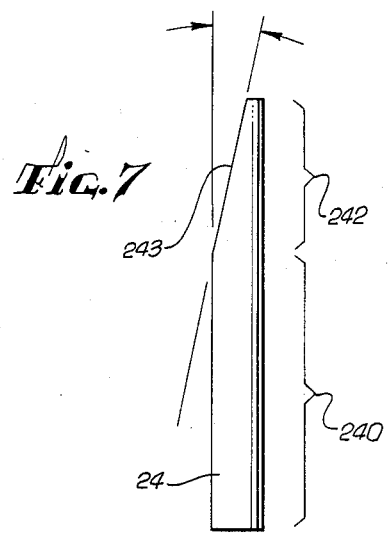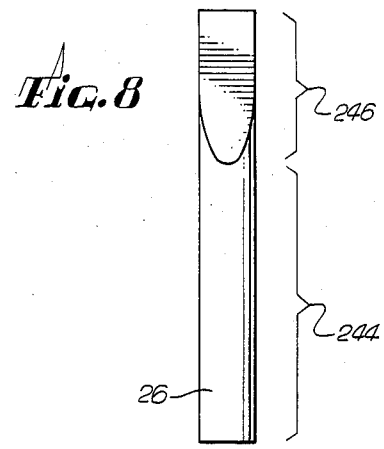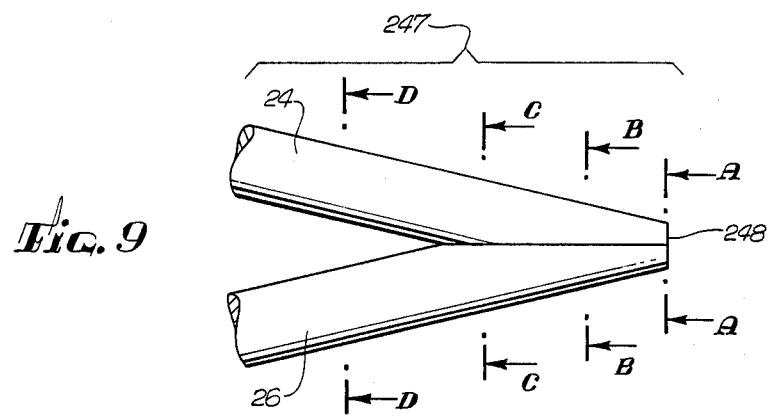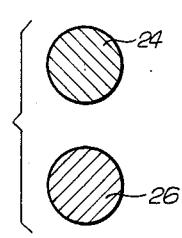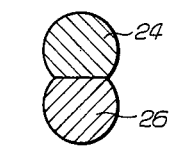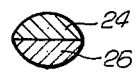

TUBING EXPANDER

BACKGROUND OF THE INVENTION

This application relates generally to medical and surgical equipment and, more particularly, to a new and improved apparatus for expanding medical or other resilient tubing.

Flexible tubing plays an important role in many industries, such as the medical field, where a conduit must be provided to transport fluids from one depot to another. Various materials have been developed for use in molding flexible, durable, and inexpensive tubing. By connecting such tubing to diverse ends and connectors, e.g. fluid containers, Y-sites, and hypodermic needles, a vast array of different systems may be readily assembled.

In order to provide an effective fluid conduit system, it is imperative that the coupling between the tubing and the mating portions of the fittings form a tight seal. In the medical field, e.g., hospitals and doctor's offices, leakage between the fittings and the tubing is especially critical since it may introduce air bubbles into the conduits, contaminating or interrupting the flow of fluid therein. Moreover, passing bubbles into the patient's bloodstream may cause emboli formation. To remedy this, a number of male-type fittings, e.g. tapered, ribbed or stepped connectors, have been developed to maintain an air-tight connection with flexible tubing. These fittings require that the tubing be threaded over or tightly received by "male" portion of the fitting. While it is possible to axially or longitudinally force the tubing over this male portion, such methodology may kink the tubing, expediting the tubing's failure, or fail to insert the fitting a sufficient distance into the tubing end to effect the required seal.

Various expander devices for insertion into and/or expansion of a collapsed tubular member from within have been known for a number of years, and by way of example, several forms of such devices can be found in U.S. Pat. Nos. 4,494,398; 3,749,365; 4,475,373; or 4,155,242.

In addition, certain tools have been developed to expand medical tubing so that the fitting can be inserted. Various medical tubing expanders include, by way of example, hand-held pliers-type devices. These latter devices generally require manual gripping by the operator. This prevents the operator from using both hands to immediately grasp and insert the fitting within the expanded tubing. Since resilient tubing begins to return to its unexpanded dimensions almost immediately after being stretched, this manual gripping reduces the effectiveness of the conventional medical tubing expanders.

Moreover, such tools typically have jaws which pivot outward relative to each other to expand the tubing. As a result, the tubing's degree of flair and rate of expansion may be adversely affected. Thus, unusually sized or resilient tubing may be subject to overstretching or splitting. Furthermore, these devices may apply the expansive stress to small portions of the tubing, causing localized material fatigue and expediting tubing failure. Because different materials vary in the optimum stretch rate, such tools may not accommodate diverse materials. As a result, conventional medical tubing expander tools have not completely resolved the needs for gradual and adjustable expansion of resilient tubing, and further have not completely resolved the need to quickly insert the fitting into the expanded tubing.

There exists, therefore, a significant long-felt need for an improved medical tubing expander assembly for expanding a variety of medical tubing types, wherein the assembly gradually and adjustably expands resilient tubing, and further wherein the expander assembly is remotely actuable.

SUMMARY OF THE INVENTION

Briefly, and in general terms, the present invention provides a new and improved tubing expander apparatus for gradually and adjustably expanding resilient tubing. Moreover, the present invention is remotely actuable, thus freeing the operator's hands for the quick insertion of a fitting within the expanded tubing.

In the presently preferred embodiment, by way of example and not necessarily by way of limitation, the tubing expander apparatus includes a base and first and second uprights mounted on the base. A pair of guide rails extends between these uprights.

A carriage is slidably mounted upon the guide rails to move in a first direction relative the first upright, from a first position adjacent the first upright to a second position spaced apart from the first upright. An end stop extends from the second upright to contact the carriage and halt its movement.

A first pin extends from the first upright. A second pin extends from the carriage. These pins extend in substantially the same direction, which differs from the direction the carriage moves, i.e., the first direction. Moreover, these pins are configured and sized to abut each other and be received within the tubing when the carriage is in the first position.

An air cylinder mounted on the first upright impels the carriage from the first position towards the second position. The air cylinder has an extendible shaft extending from the first upright towards the second upright, the shaft having a distal shaft end abutting the carriage. A foot-switch, in communication with the air cylinder, selectively actuates the air cylinder to extend the shaft outward and move the carriage toward the second position, separating the pins from each other, and expanding the tube diametrically.

These and other objects and advantages of the invention will become apparent from the following more detailed description, when taken in conjunction with the accompanying drawings of illustrative embodiment.

BRIEF DESCRIPTION OF THE DRAWINGS

FIG. 7 is a bottom plan view of the first pin as shown in FIG. 3;

FIG. 8 is a side plan view of the second pin as shown in FIG. 3;

FIG. 9 is a top plan view of the first and second pins in abutting relationship in the first or closed position;

FIG. 10 is a sectional view taken along the line A—A of FIG. 9;

FIG. 11 is a sectional view taken along the line B—B of FIG. 9;

FIG. 12 is a sectional view taken along the line C—C of FIG. 9; and

FIG. 13 is a sectional view taken along the line D—D of FIG. 9.

DETAILED DESCRIPTION OF THE INVENTION

Figure 1:
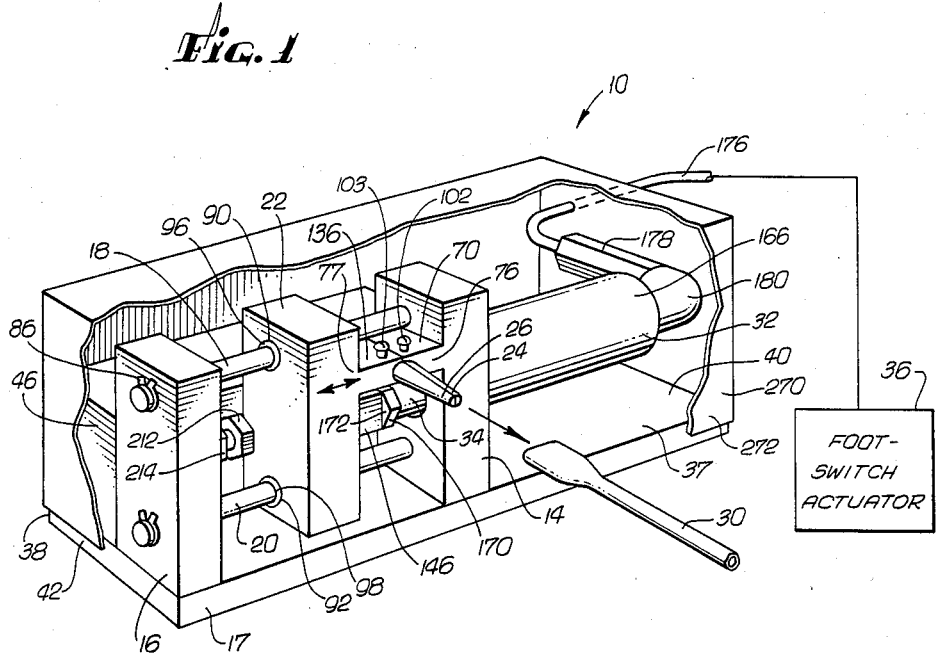
FIG. 1 is a fragmentary, top perspective view of a tubing expander apparatus constructed in accordance with the present invention.
Figure 2:
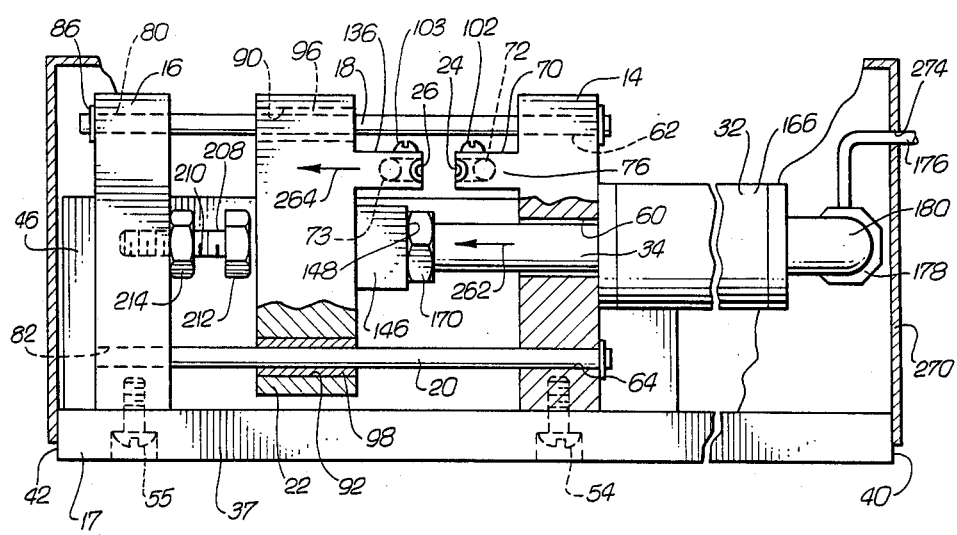
FIG. 2 is a fragmentary, elevational sectional view of the tubing expander apparatus of FIG. 1.

Referring now to the drawings for the purposes of illustration, and particularly to FIGS. 1 and 2, a tubing expander apparatus, referred to generally by the reference numeral 10, is provided for expanding resilient tubing.

As shown specifically in FIGS. 1 and 2, the tubing expander apparatus of the present invention comprises first and second uprights 14 and 16, respectively, mounted to a base 17. A pair of guide rails 18 and 20 extend between the uprights. A carriage 22 is slidably mounted on the guide rails to move in a first direction from a first position adjacent the first upright, to a second position spaced apart from the first upright. A first pin 24 extends from the first upright. A second pin 26 extends from the carriage. These pins are positioned adjacent each other and sized to be received within the tubing 30 to be expanded when the carriage is in the first position. An air cylinder 32, mounted on the first upright, has an extendible shaft 34 abutting the carriage. A foot-switch 36 actuates the air cylinder, extending the shaft, and impelling the carriage to the second position. As a result, the pins separate from each other, expanding the tubing in a diametric direction.

More specifically, the present invention includes a base 17. In the presently preferred form, the base comprises a rectangular plate, which has a first or front portion 37. The front portion 37 may be defined as the side of the base to which the tubing extends towards the apparatus. In addition, the base includes, relative to the front portion, a second or back portion 38, a third or right portion 40, and a fourth or left portion 42. A longitudinal axis (length) is defined as that extending from the right portion towards the left portion of the base. A long transverse axis (width) is defined as that substantially perpendicular to the longitudinal axis, extending from the front portion to the back portion of the base. A short transverse axis (thickness) is defined as that substantially perpendicular to both the longitudinal and lateral axes, extending vertically relative to the base. By way of example, the base may include a rectangular block of aluminum about eight inches long, by about four inches wide and about three-eighths inches thick.

A weight block 46, mounted on the base 17, may be provided to assure a stationary base. The weight block prevents the base from moving despite application of a force on the apparatus, for example the application of pressure by an operator fitting the tubing 30 onto the pins 24 and 26. The weight block may be mounted towards the back portion 38 of the base by conventional attaching means (not shown), e.g. bolts or self-tapping machine screws. By way of example, the weight block may be a rectangular block of steel about five and one-half inches long, by about two inches wide and about one and one-half inches thick.

First and second uprights or endblocks 14 and 16 are mounted on the base 17 and spaced apart from each other. The first endblock 14 may be mounted towards the front portion 36 of the base, about midway between the left and right portions. Conventional bolt means 54 may secure the upright to the base. Formed within the first endblock is a central bore 60, which extends longitudinally therethrough. By way of example, the central bore may be vertically disposed about midway up the first endblock. Also formed within the first endblock are two vertically aligned guide rail bores 62 and 64, which may be formed above and below the central bore 60, respectively.

As best shown in FIG. 2, a pinblock 70 extends from the first upright 14 towards the second upright 16. The pinblock 70 has a pinblock bore 72 extending into the pinblock 70 from a front-facing surface 76 of the pinblock 70 along an axis inclined away from the second upright 16 at an acute angle of about five to ten degrees with respect to the long transverse axis of the base 17. An angle of seven degrees gives good results.

As best shown in FIG. 2, the second upright or endblock 16 is mounted on the left portion 42 of the base 17 by conventional bolt means 55 to space apart the second upright from the first upright. The second upright 16 has vertically aligned guide rail bores 80 and 82 formed therein. The second upright guide rail bores 80 and 82 are positioned to be coaxial with the guide rail bores 62 and 64 of the first upright 14.

A pair of guide rails 18 and 20 are provided to guide and slidably mount the carriage 22, enabling its movement from adjacent the first upright. The guide rails extend between and are substantially perpendicular to the first and second uprights 14 and 16, respectively. The guide rail 18 passes through the longitudinal guide rail bores 62 and 80 of the first and second uprights 14 and 16 and the guide rail 20 passes through the longitudinal guide rail bores 64 and 82 of the first and second uprights 14 and 16. The guide rails may be disposed substantially parallel to each other, one above the other in a substantially vertical plane. The guide rails may have an annular groove, disposed at opposite guide rail ends so that snap rings 86 can engage the guide rails and maintain their positioning relative to the uprights. The guide rails 18 and 20 may also be in threaded engagement with the respective endblocks to provide additional rigidity and maintain the endblocks in a spaced apart defined relationship.

A carriage 22 is provided having carriage bores 90 and 92, to receive the guide rails 18 and 20 therethrough. The carriage is slidably mounted to move in a first direction, longitudinally along the guide rails from a first position adjacent the first upright to a second position spaced apart from the first upright, that is, towards the second upright. Bushings 96 and 98 may be received within the carriage bores to reduce the sliding friction generated by the carriage moving upon the guide rails and to provide a replaceable bearing surface. By the use of these bushings, friction and the resultant wear of the carriage bore is decreased, reducing the need to replace the entire carriage after extensive use.

A first carriage projection 136 extends from the carriage 22 towards the first upright 14. The first carriage projection 136 may be mounted on the carriage and positioned substantially opposite the pinblock 70 extending from the first upright. The first carriage projection 136 has a carriage pin bore 73 (analogous to the pinblock bore 72 in the pinblock 70) extending into the projection 136 from a front-facing surface 77 of the projection 136 along an axis inclined toward the second upright 16 at an acute angle of about five to ten degrees with respect to the long transverse axis of the base 17. An angle of seven degrees gives good results.

The first pin 24 comprises a first portion 240 having a generally uniform cross-section for insertion into the pinblock bore 72 and a second portion 242 having a tapered, generally semicircular cross-section for insertion into the tubing 30 as shown in FIG. 7. The tapered portion 242 may be made, for example, by grinding or otherwise flattening a side of the pin 24 to form a planar surface 243 inclined toward a longitudinal axis of the pin 24 at an acute angle of about five to ten degrees with respect to said axis, said angle being generally equal to the angle between the axis of the bore 72 and the long transverse axis of the base 17.

The second pin 26 also comprises a first portion 244 having a generally uniform cross-section for insertion into the carriage pin bore 73 and a second portion 246 having a tapered, generally semicircular cross-section for insertion into the tubing 30 as shown in FIG. 8. The tapered portion 246 may be made in a manner similar to that used to make the tapered portion of the first pin 24.

The flattened surfaces of the tapered portions of the pins 24 and 26 fit together in a complemental abutting relationship as shown in FIG. 9. When the portions 242 and 246 together define a tapered projection 247 having at its tip 248 an oval cross-section as shown in the section view A—A of FIG. 10. A short distance from the tip 248 the projection 247 presents a circular cross-section as shown in the section view B—B of FIG. 11; still further from said tip the projection presents a cross section as of two circles partially pressed together as shown in the section view C—C of FIG. 12;, and still further from said tip the projection presents a cross section of two adjacent circles as shown in the section view D—D of FIG. 13.

The pins 24 and 26 are removably mounted in their respective bores 72 an 73 by bolt means 102 and 103 or the like to facilitate removal and replacement of the pins if a pin breaks or if it is desired to exchange the pins for pins of different size according to the size of the tubing to be expanded.

When the pins 24 and 26 are installed in their respective bores 72 and 73, they extend from the pinblock 70 and the first carriage projection 136, respectively, towards the front portion 37 of the base 17, generally transversely to the direction of motion of the carriage 22 and defining between each other an acute angle equal to the sum of the angles defined between the axes of the bores and the long transverse axis of the base 17. When the carriage 22 is in its first position adjacent the first upright 14, the pin 26 abuts the pin 24, defining the tapered projection 247 onto which the tubing 30 can be pressed.

As best shown in FIG. 2, a second carriage projection 146, having a transverse carriage projection surface 148, extends from the carriage towards the first upright and is positioned substantially opposite the central aperture 60 in the first upright 14 to contact the extendible shaft 34. This second carriage projection reduces the distance that the extendible shaft needs to extend before abutting the carriage. The carriage projection may be in the form of an integral projection formed in said first upright, or in the form of a clevis block (not shown) having two generally parallel clevis block legs extending from the clevis to form an H-shaped engaging end. These legs may be received into corresponding longitudinal bores formed within the carriage. In this form, a transverse securing bore, may extend through the carriage to communication with the bores formed in the carriage block. A retaining member which is received through the securing bore and corresponding transverse clevis leg bores secures the clevis block to the carriage.

An air cylinder 32 impels the carriage 22 away from the first upright 14, enabling gradual and adjustable separation of the pins 24 and 26. Generally, the air cylinder may include equivalent pneumatic or hydraulic expansion means. The air cylinder 18, having a body 166, is mounted upon the right endblock 14, to selectively impel the carriage 22 from the first position adjacent the right endblock to the second position remote from the right endblock. A jam nut (not shown) may be received within the central bore 60 to threadingly engage a portion of the air cylinder body. The air cylinder body may extend from the first upright towards the right portion 40 of the base. The extendible shaft 34 is sized to pass through and, when the air cylinder is mounted to the first upright, is substantially coaxial with, the central bore 60 of the right endblock. Upon actuation of the air cylinder, the shaft moves or extends outward, away from the air cylinder body and the first upright 14, towards the second upright 16. The shaft may have a head 170 formed at the distal shaft end opposite the air cylinder body, the head having an abutting surface 172. The area of the abutting surface may be greater in vertical cross-section than that of the extendible shaft 34 to distribute the applied impelling force over a broader area of the carriage 22.

A foot switch 36 is provided to remotely actuate the air cylinder 32. More specifically, the foot switch 36 is fluidly communicated with the air cylinder 32 by a connecting line 176. The foot switch may supply a hydraulic or pneumatic output in response to a squeezing pressure applied by an operator's foot. Interposed between and in fluid communication with the foot switch and the air cylinder is a flow control valve 178. The control valve 178 receives the output from the foot switch and adjusts the speed of the axial extension of the extendible shaft 34. An L-bend 180 may be used to fluidly communicate the control valve 178 and the air cylinder 32 to permit the air cylinder to fit within more compact confines.

An end stop 208 is provided to adjust the maximum amount of separation of the pins 24 and 26 by halting the movement of the carriage 22 relative to the first upright 14. The end stop 208 is mounted on the second upright 16 and extends from the second upright towards the first upright. As best shown in FIG. 2, the end stop 108 may be in the form of an end stop bolt 210 threadingly engaged with the second upright and extending substantially perpendicular and outward therefrom, i.e. along a longitudinal axis. The end stop bolt may have an end stop head portion 212 and may be in threaded engagement with an end stop jam nut 214. The end stop bolt 210 cooperates with the end stop jam nut to affix the outward displacement of the end stop bolt head from the second upright towards the first upright. As a result, the longitudinal position of the end stop bolt head relative to the endblocks can be adjusted.

As shown in FIGS. 1 and 2, a housing 270, having an oval aperture (not shown) positioned on the front face 272 of the housing and a second aperture 274 disposed in the right or first end 40, is mounted upon the base 17 to substantially enclose the tubing expander apparatus 10. More specifically, the oval aperture is positioned to permit the extension of the second portions 242 and 246 of the first and second pins 24 and 26, respectively, beyond the housing to enable the tubing 30 to be pressed thereon. Furthermore, the end aperture 274 is disposed towards the right end of the housing 276 to permit the passage of the connecting line 176 from the remote actuator to the control valve 178.

In operation, the carriage 22 is returned to the first position to bring the two pins 24 and 26 into abutting relationship to enable the pins to be received within the tubing 30 to be expanded. The operator presses the tubing onto the pins 24 and 26 and then depresses the foot switch 36, generating an output. This output is communicated through the connecting line 176 and the control valve 178 to the air cylinder 32, extending the air cylinder shaft 34 outward as indicated by the arrow 262 in FIG. 2. The abutting surface area 172 on the shaft 34 contacts the second carriage block projection 146. The shaft 34, as it moves outward from the air cylinder body 166, slidably moves or impels the carriage 22, as indicated by the arrow 264 in FIG. 2, along the guide rails, away from the first position adjacent the first upright 14 toward the second upright 16 into the second position spaced apart from the first upright 14.

Figure 3:
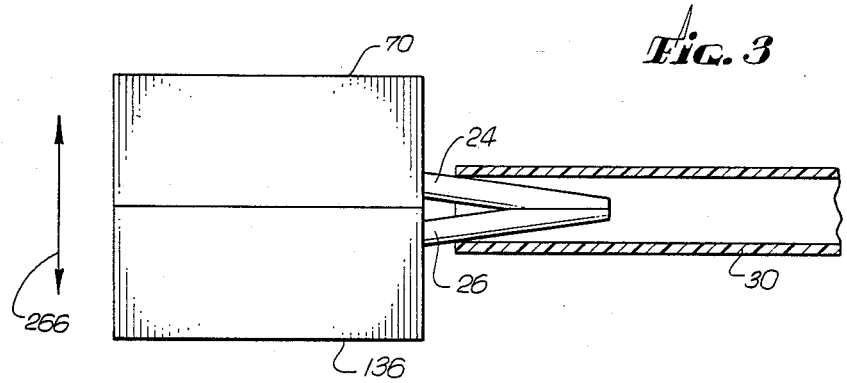
FIG. 3 is an enlarged fragmentary, sectional plan view of the pins of the present invention in the first or closed position received within the tubing to be expanded.

As the carriage moves as indicated by the arrow 264 in FIG. 2, the second pin 26 moves away from the first pin 24 as indicated by the arrows 266 in FIG. 3. As a result, the tubing 30 on the pins expands in a substantially diametric manner without localized or sudden stress being sustained by the tubing 30. This reduces material fatigue and failure. Diametric expansion, in the context of this case, is defined as the outward radial expansion of the tubing by the outward separation of the pins, relative to each other, received within the tubing. Adjusting the control valve 178 enables the operator to adjust the speed with which the shaft extends, enabling the operator to provide differing rates of tubing expansion as required. The carriage continues to slidably move away from the first upright 14 along the guide rails 18 and 20 until the carriage abuts the end the end stop 208.

Figure 4:
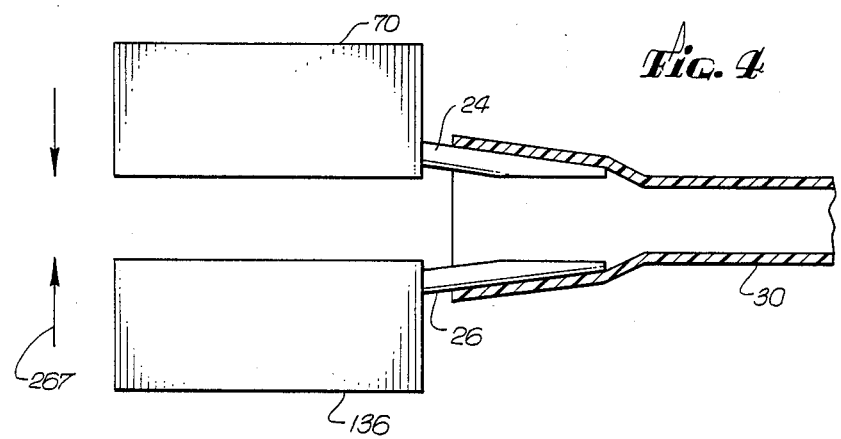
FIG. 4 is an enlarged fragmentary, sectional plan view of the pins of the present invention in the second or expanded position, received within the tubing.

After the tubing is expanded to the desired dimension, the air cylinder 32 is deactivated to return the pins back toward each other as indicated by the arrows 267 in FIG. 4.

Figure 5:
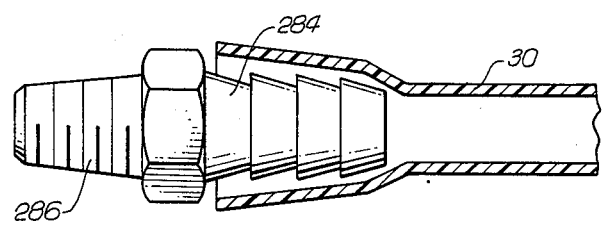
FIG. 5 is an enlarged sectional, plan view of the expanded tubing receiving the male portion of a connector fitting.

Referring to FIG. 5, the tubing 30 is then disengaged from the pins 24 and 26. A male portion 284 of a fitting 286, having a larger outside diameter than the inside diameter of the unexpanded tubing 30, is quickly inserted within the expanded tubing end. Since the tubing expander apparatus 10 is remotely actuable, the operator has both hands free to immediately insert the connector into the expanded tubing. Preferably, the male portion of the fitting is inserted within the expanded tubing portion within about three to about five seconds from the withdrawal of the pins from within the tubing portion 30.

Figure 6:
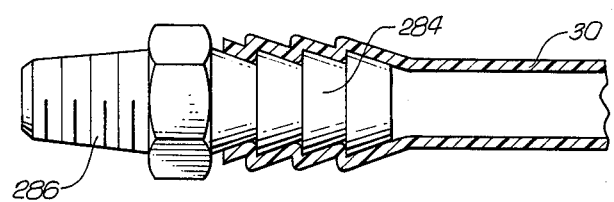
FIG. 6 is an enlarged sectional, plan view of the expanded tubing tightly engaged about the male portion of the connector fitting.

After the male portion of the fitting is received within the expanded tubing, the tubing, because of its resilient nature, will contract back towards its original dimensions, as depicted in FIG. 3. However, as best shown in FIG. 6, because the inserted male portion 284 of the fitting has a greater outside diameter than the inside diameter of unexpanded tubing, the tubing 30 will instead conform about and tightly engage the inserted male portion, providing a tight seal about the connector. The tubing may be allowed to contract for an additional twenty-four hours to ensure an optimal seal.

The present invention provides an improved device for expanding the end of tubing without applying or maintaining localized stress to the tubing, to fatigue or expedite the deterioration of the tubing. Furthermore, by the use of an air cylinder and a flow control valve, the rate of expansion can be adjusted to minimize splitting of the tubing. In addition, the interchangeability of the pins permits ready replacement of broken pins and substitution of pins of various sizes as needed according to the diameter of the tubing to be expanded. The use of the foot switch to activate the expander enables the operator to use both hands to immediately grasp and insert the fitting within the expanded tubing.

It will be apparent from the foregoing that, while particular forms of the invention have been illustrated and described, various modifications can be made without departing from the spirit and scope of the invention. Accordingly, it is not intended that the invention be limited, except as in the appended claims.

What is claimed is:

1. Apparatus for expanding resilient tubing, comprising:
   a base;
   a first block rigidly mounted on said base;
   a guide supported in relation to said first block;
   a second block slidably carried by the guide for movement in a first direction relative to said first block, from a first position adjacent said first block to a second position spaced apart from said first block; and
   first and second pins carried by the first and second blocks, respectively for movement therewith, said pins extending from said blocks in substantially the same direction, which differs from said first direction, and being configured to substantially abut each other and be received within said resilient tubing when said blocks are in said first position and to separate from each other when said blocks are in said second position, whereby said pins expand said tubing in a diametric direction.

2. Apparatus according to claim 1 wherein the pins are inclined relative to each other such that longitudinal axes of the pins define therebetween an acute angle of not more than about twenty degrees.

3. Apparatus according to claim 2 wherein the acute angle remains constant as the second block moves toward said second position carrying the second pin away from the first pin.

4. Apparatus according to claim 1 wherein each pin is flat on one side for at least a portion of its length, the flat side of the first pin abutting and parallel with the flat side of the second pin when the blocks are in said first position, the flat sides remaining parallel with each other as the second block moves toward said second position carrying the second pin away from the first pin.

5. Apparatus according to claim 1 wherein a side of an extremity of each of the pins is flat, defining a planar surface inclined toward a longitudinal axis of the pin at an acute angle and wherein the pins are inclined relative to each other such that their longitudinal axes define therebetween an angle of about twice said acute angle, the flat side of the first pin abutting and parallel with the flat side of the second pin when the blocks are in said first position, the flat sides remaining parallel with each other as the second block moves toward said second position carrying the second pin away from the first pin.

6. Apparatus for expanding resilient tubing, comprising:
   a base;
   an upright mounted on said base;
   a guide mounted on said upright;
   a carriage slidably mounted upon said guide to move in a first direction relative to said upright, from a first position adjacent said upright to a second position spaced apart from said upright;
   impelling means for moving said carriage towards said second position, said impelling means abutting said carriage;
   a first pin extending transversely, relative to said first direction, from said upright; and
   a second pin extending transversely relative to said first direction from said carriage member, said first and second pins extending in substantially the same direction, which differs from said first direction, and being configured to substantially abut each other and be received within said resilient tubing when said carriage is in said first position and to separate from each other when said carriage is in said second position, whereby said pins expand said tubing in a diametric direction.

7. Apparatus according to claim 6 wherein the pins are inclined relative to each other such that longitudinal axes of the pins define therebetween an acute angle of not more than about twenty degrees.

8. Apparatus according to claim 7 wherein the acute angle remains constant as the carriage moves toward said second position carrying the second pin away from the first pin.

9. Apparatus according to claim 6 wherein each pin is flat on one side for at least a portion of its length, the flat side of the first pin abutting and parallel with the flat side of the second pin when the carriage is in said first position, the flat sides remaining parallel with each other as the carriage moves toward said second position carrying the second pin away from the first pin.

10. Apparatus according to claim 6 wherein a side of an extremity of each of the pins is flat, defining a planar surface inclined toward a longitudinal axis of the pin at an acute angle and wherein the pins are inclined relative to each other such that their longitudinal axes define therebetween an angle of about twice said acute angle, the flat side of the first pin abutting and parallel with the flat side of the second pin when the carriage is in said first position, the flat sides remaining parallel with each other as the carriage moves toward said second position carrying the second pin away from the first pin.

11. Apparatus for expanding resilient tubing, comprising:
   a first and second uprights spaced apart from each other;
   a first tapered pin extending laterally from said first upright;
   an air cylinder mounted on said first upright, said air cylinder having an extendible shaft, having a distal end, extending towards said second upright;
   remote means, in communication with said air cylinder, for selectively actuating said air cylinder to extend said extendible shaft;
   a first and second slide rails extending between said first upright and said second upright;
   a carriage member, slidably mounted on said slide rails, to move in a first direction relative to said first upright, from a first position adjacent said first upright to a second position spaced apart from said first upright, said carriage member abutting said distal end of said extendible shaft; and
   a second tapered pin extending laterally from said carriage member, said pins extending in substantially the same direction, which differs from said first direction, and being configured to substantially abut each other and be received within said resilient tubing when said carriage is in said first position and to separate from each other when said carriage is in said second position, whereby said tapered pins expand said tubing in a diametric direction, when actuation of the said air cylinder extends said extendible shaft abutting said carriage member, towards said second position, impelling said carriage member towards said second position and expanding said tubing received upon said tapered pins.

* * * * *

UNITED STATES PATENT AND TRADEMARK OFFICE
CERTIFICATE OF CORRECTION

PATENT NO.  :  4,787,838
DATED       :  Nov. 29, 1988
INVENTOR(S) :  Mark C. Doyle It is certified that error appears in the above-identified patent and that said Letters Patent is hereby corrected as shown below:

Column 5, line 30, after "When the" insert --pins are disposed in said abutting relation, the tapered--.

Column 6, line 6, delete "to communication with" and insert therefore --in communication with--.

Signed and Sealed this

Eighteenth Day of June, 1991

Attest:

HARRY F. MANBECK, JR.

Attesting Officer

Commissioner of Patents and Trademarks